(12) United States Patent
Kim

(10) Patent No.: US 10,372,253 B2
(45) Date of Patent: Aug. 6, 2019

(54) TOUCH DISPLAY DEVICE AND BACKLIGHT UNIT THEREOF

(71) Applicant: LG DISPLAY CO., LTD., Seoul (KR)

(72) Inventor: Mira Kim, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 177 days.

(21) Appl. No.: 15/225,635

(22) Filed: Aug. 1, 2016

(65) Prior Publication Data

US 2017/0285829 A1 Oct. 5, 2017

(30) Foreign Application Priority Data

Apr. 4, 2016 (KR) .................. 10-2016-0040780

(51) Int. Cl.
*G06F 3/044* (2006.01)
*G06F 3/041* (2006.01)

(52) U.S. Cl.
CPC ............ *G06F 3/0414* (2013.01); *G06F 3/044* (2013.01); *G06F 3/0412* (2013.01); *G06F 2203/04106* (2013.01)

(58) Field of Classification Search
CPC .................................................. G06F 3/0414
See application file for complete search history.

(56) References Cited

U.S. PATENT DOCUMENTS

| | | | |
|---|---|---|---|
| 9,563,317 B2 * | 2/2017 | Sleeman | ................ G06F 3/044 |
| 2011/0037726 A1 | 2/2011 | Lee | |
| 2011/0080373 A1 | 4/2011 | Wang et al. | |
| 2012/0327025 A1 | 12/2012 | Huska et al. | |
| 2013/0208510 A1 * | 8/2013 | Takashima | ............. G09F 13/04 362/615 |
| 2014/0176485 A1 * | 6/2014 | Holmberg | ............... G06F 3/041 345/174 |
| 2015/0324033 A1 * | 11/2015 | Kim | ....................... G06F 3/044 345/174 |
| 2016/0088133 A1 | 3/2016 | Kim et al. | |

FOREIGN PATENT DOCUMENTS

| | | |
|---|---|---|
| KR | 10-2010-0073590 A | 7/2010 |
| KR | 10-2012-0103062 A | 9/2012 |
| KR | 10-2014-0115924 A | 10/2014 |
| KR | 10-2014-0123025 A | 10/2014 |
| KR | 10-2015-0006269 A | 1/2015 |
| KR | 10-2015-0124431 A | 11/2015 |
| KR | 10-1583765 B1 | 1/2016 |
| KR | 10-2016-0025161 A | 3/2016 |
| WO | WO 2013/107474 A1 | 7/2013 |

* cited by examiner

*Primary Examiner* — Nelson M Rosario

(74) *Attorney, Agent, or Firm* — Birch, Stewart, Kolasch & Birch, LLP

(57) ABSTRACT

Discussed is a touch display device able to sense a touch position of a user touch and an amount of user touching force. A case disposed below the backlight unit is used as a touching force sensing electrode, enabling a touch display device to sense touch force using the case. A gap is formed by an open area in the bottom cover of the backlight unit, enabling the user touching force to be sensed without an increase in the thickness of the touch display device.

18 Claims, 12 Drawing Sheets

TOUCH DISPLAY DEVICE AND BACKLIGHT UNIT THEREOF

CROSS REFERENCE TO THE RELATED APPLICATION

This application claims priority from Korean Patent Application No. 10-2016-0040780 filed on Apr. 4, 2016, which is hereby incorporated by reference for all purposes as if fully set forth herein.

BACKGROUND OF THE INVENTION

Field of the Invention

The present disclosure relates to a touch display device and a backlight unit included therein.

Description of the Related Art

In response to the development of the information society, demands for a variety of display devices for displaying images are increasing. In this regard, a range of display devices, such as liquid crystal display (LCD) devices, plasma display panels (PDPs), and organic light-emitting display devices, are used.

Among display devices, small display devices used in mobile display devices, such as smartphones and tablets, and medium-sized or larger display devices, such as smart TVs, provide a touch-based user interface for user convenience according to various device characteristics.

Such display devices providing touch-based user interfaces are being developed to provide a wider range of functions, and user demands are also becoming ever more diverse.

However, currently available touch-based user interfaces are only designed to detect a point touched by a user (touched coordinates) and execute input processing at the sensed touch position. Current touch-type user interfaces are limited in their ability to provide a large number of functions in a range of types and shapes and must satisfy a large number of user demands.

SUMMARY OF THE INVENTION

Various aspects of the present invention provide a touch display device not only able to sense a touch position (touched coordinates) of a user touch, i.e. a touch made by a user, but also to sense an amount of user touching force, i.e. an amount of touching force with which a user presses against a screen to make the touch, whereby a large number of functions of touch-based user interfaces can be provided in a range of types and shapes.

Also provided are a touch display device and a backlight unit thereof, the touch display device being able to sense an amount of user touching force corresponding to an amount of force with which a user presses against a screen to make a touch.

Also provided is a touch display device able to uniformly sense an amount of user touching force in respective positions on a display panel, the user touching force corresponding to an amount of force with which a user presses against a screen to make a touch.

Also provided are a backlight unit and a touch display device including the same, the backlight unit being configured to reduce the thickness of the touch display device that senses an amount of touching force.

According to an aspect of the present disclosure, a touch display device is able to not only sense a touch position (touched coordinates) of a user touch but also to sense an amount of user touching force, i.e. an amount of touching force with which a user presses against a screen to make the touch.

The touch display device may include first electrodes disposed within a display panel and a second electrode disposed out of the display panel.

The touch display device may be configured such that a gap is present between the first electrodes and the second electrode, the size of the gap being able to change depending on the amount of touching force.

Here, the touch display device may include a gap structure unit disposed between the plurality of first electrodes and a structure disposed below the display panel such that the gap may be present between the bottom surface of the display panel having the first electrodes disposed therein and the top surface of a structure disposed below the display panel.

Alternatively, the touch display device may include a gap structure unit disposed between the second electrode and the structure disposed below the display panel such that the gap may be present between the bottom surface of the structure disposed below the display panel and the top surface of the second electrode.

When the gap is present between the bottom surface of the structure disposed below the display panel and the top surface of the second electrode, the gap may be formed by an open area of the bottom cover accommodating the structure and situated between the structure and the second electrode.

Specifically, due to the open area being formed in the portion of the bottom cover corresponding to the bottom surface of the structure, the gap corresponding to the thickness of the bottom cover is formed between the bottom surface of the structure and the top surface of the second electrode to be present between the first electrodes and the second electrode.

In addition, the open area of the bottom cover may be open areas formed in the portion of the bottom cover corresponding to the bottom surface of the structure. For example, the open areas may have the same shape (e.g. a circle, a rectangle, or so on) and the same size and may be arranged at predetermined distances from each other.

The second electrode may be implemented as the bottom cover or a case disposed below the bottom cover. In a force driving period, a ground voltage signal is applied to the bottom cover or the case corresponding to the second electrode, whereby an amount of user touching force can be sensed.

In addition, the display panel and the bottom cover may be connected to each other by means of a bonding material disposed on outer margins of the display panel and outer margins of the bottom cover.

Here, some of portions of the bonding material bonded to the outer margins of the display panel and the outer margins of the bottom cover may be stepped.

According to another aspect of the present disclosure, a backlight unit may allow a touch display device to sense an amount of user touching force.

The backlight unit may include a light source and a light guide plate guiding light incident from the light source to a display panel. In addition, the backlight unit may include a gap structure unit.

The backlight unit may include a bottom cover accommodating the light source and the light guide plate, wherein the bottom cover may have an open area. Alternatively, the backlight unit may include a bottom cover accommodating the light source and the gap structure unit.

The open area of the bottom cover may form a gap between the bottom surface of the light source or the light guide plate and a top surface of a second electrode disposed below the bottom cover. Alternatively, the gap structure unit may form a gap between a bottom surface of the display panel and a top surface of the light source or between a top surface of the bottom cover and a bottom surface of the light source.

As set forth above, according to an embodiment of the present disclosure, the touch display device is able to not only sense a touch position (touched coordinates) of a user touch but also to sense an amount of user touching force, i.e. an amount of touching force with which a user presses against a screen to make the touch, whereby a large number of functions of touch-based user interfaces can be provided in a range of types and shapes.

In addition, according to an embodiment of the present disclosure, the touch display device and the backlight unit thereof are able to sense an amount of user touching force corresponding to an amount of force with which a user presses against a screen to make a touch.

Furthermore, according to an embodiment of the present disclosure, the open area of the bottom cover accommodating a structure disposed below the display panel prevents the bottom cover from warping, thereby preventing the uniformity of touching force sensing from decreasing due to the warping of the bottom cover.

In addition, according to an embodiment of the present disclosure, the open area of the bottom cover forms the gap between the first electrodes and the second electrode, thereby preventing the gap for touching force sensing from increasing the thickness of the touch display device.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION OF THE EMBODIMENTS

Figure 1:
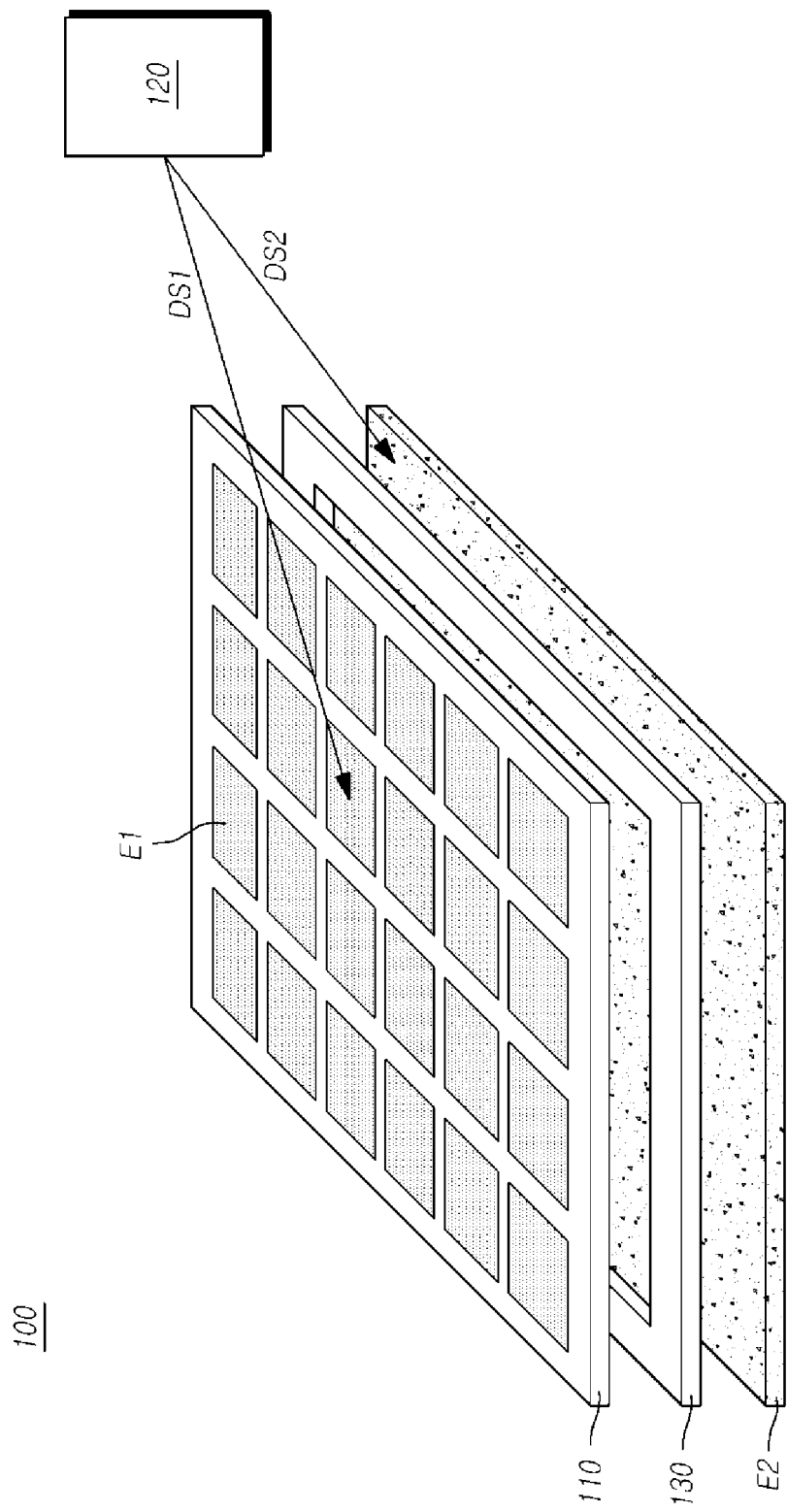
FIG. 1 and FIG. 2 schematically illustrate the configuration of a touch display device according to an embodiment of the present invention.

Hereinafter, reference will be made to embodiments of the present disclosure in detail, examples of which are illustrated in the accompanying drawings. Throughout this document, reference should be made to the drawings, in which the same reference numerals and signs will be used to designate the same or like components.

It will also be understood that, while terms such as "first," "second," "A," "B," "(a)," and "(b)" may be used herein to describe various elements, such terms are only used to distinguish one element from another element. The substance, sequence, order or number of these elements is not limited by these terms. It will be understood that when an element is referred to as being "connected to," "coupled to," or "fastened to" another element, not only can it be "directly connected or coupled to" the other element, but it can also be "indirectly connected, coupled, or fastened to" the other element via an "intervening" element.

Figure 2:
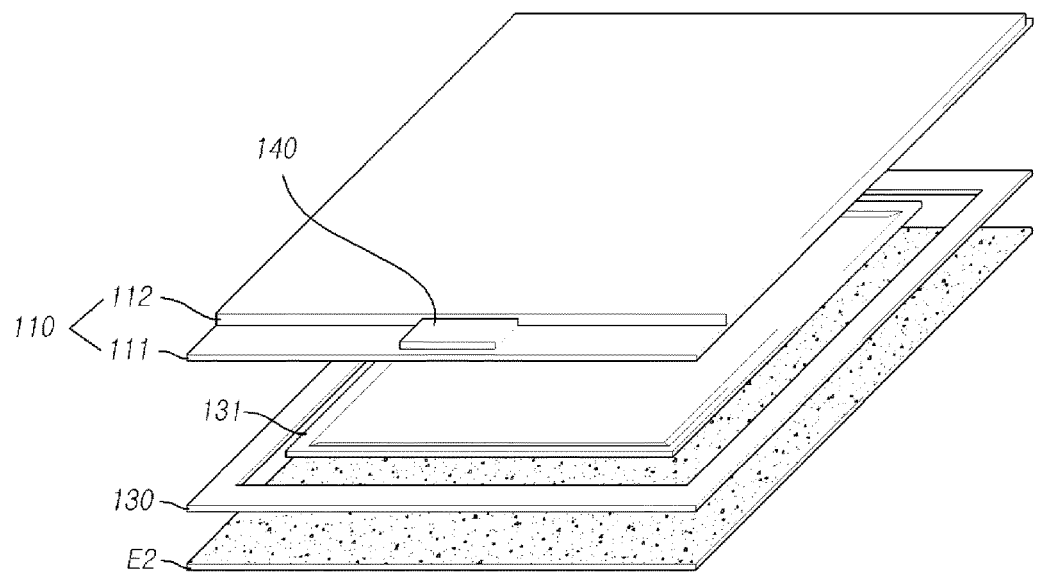

FIG. 1 and FIG. 2 schematically illustrate the configuration of a touch display device 100 according to an embodiment of the present invention.

Referring to FIG. 1, the touch display device 100 according to an embodiment of the present invention includes: first electrodes E1 sensing a user touch (i.e. a touch that has been made by a user) and a touch position (touched coordinates); a second electrode E2 sensing a user touching force, i.e. an amount of touching force with which the user has made the touch; a display panel 110 having the first electrodes E1 disposed therein; a driver circuit 120 driving the first electrodes E1 and the second electrode E2; and a gap structure unit 130 maintaining a gap between the first electrodes E1 and the second electrode E2.

The touch display device 100 according to an embodiment of the present invention may operate in a display mode to display images or in a touch mode to sense a user touch (e.g. whether or not a touch has been made by a user, a touch position, and an amount of touching force).

When the touch display device 100 operates in the display mode, the touch display device 100 displays images by driving data lines and gate lines disposed on the display panel 110.

Here, display driving voltages for displaying images are applied to the first electrodes E1 disposed within the display panel 110. That is, the first electrodes E1 operate as display driving electrodes in a display mode period.

In the touch mode, the touch display device 100 can sense a touch position (touched coordinates) of a user touch and can sense an amount of user touching force, i.e. an amount of touching force with which the user has made the touch.

When sensing the touch position (touch coordinates) of the user (i.e. in a touch driving period), the driver circuit 120 senses the touch position (touch coordinates) of the user by sequentially applying a first electrode driving signal DS1 to the first electrodes E1.

When sensing user touching force (i.e. in a force driving period), the driver circuit 120 senses user touching force by applying the first electrode driving signal DS1 to the first electrodes E1 and applying a second electrode driving signal to the second electrode E2.

When a vertical load is formed on the display panel 110 by the user, the touch display device 100 according to an embodiment of the present invention senses user touching force using changes in the gap between the first electrodes E1 and the second electrode E2.

Thus, a gap must be present between the first electrodes E1 disposed in the display panel 110 and the second electrode E2 disposed outside of the display panel 110, and the gap structure unit 130 is disposed between the first electrodes E1 and the second electrode E2 to maintain the gap.

The gap structure unit 130 allows the size of the gap between the first electrodes E1 and the second electrode E2 to change in response to a user touch. Based on changes in the size of the gap, not only the touch position (touch coordinates) of the user but also user touching force can be sensed.

Hereinafter, a more detailed structure of the touch display device 100 according to an embodiment of the present invention will be described with reference to FIG. 2.

Referring to FIG. 2, the touch display panel 110 of the touch display device 100 according to an embodiment of the present invention includes a first substrate 111 on which thin-film transistors (TFTs) and so on are disposed and a second substrate 112 on which color filters (CF) and so on are disposed.

A driver chip 140 may be mounted, bonded, or connected to a margin (i.e. a non-active area) of the first substrate 111.

The driver chip 140 may be a chip embodying the entirety or a portion of the driver circuit 120, may be a data driver chip, or may be a display driver chip embodying the entirety or portions of the driver circuit 120 and the data driver chip.

A lower structure 131 may be disposed below the display panel 110, and the second electrode E2 may be disposed below the lower structure 131 or therein.

The lower structure 131 may be, for example, a backlight unit of a liquid crystal display (LCD) device.

In this instance, the second electrode E2 may be positioned below the backlight unit. Thus, the second electrode E2 may be positioned without interrupting the light-emitting function of the backlight unit.

The gap structure unit 130 may be positioned below or on the sides of the lower structure 131. In addition, the second electrode E2 may be positioned below or within the gap structure unit 130.

As described above, it is possible to realize a touching force sensing structure suitable to structural designs of the display panel 110 and the touch display device 100 by variously designing the position of the second electrode E2, the position of the gap structure unit 130, or so on.

Hereinafter, a process in which the touch display device 100 according to an embodiment of the present invention senses a touch position (touch coordinates) and an amount of user touching force will be described with reference to FIG. 3 and FIG. 4. For the sake of clarity, the touch display device 100 according to an embodiment of the present invention will be illustrated as being an LCD device. However, other display devices are possible, including organic light-emitting display devices.

Figure 3:
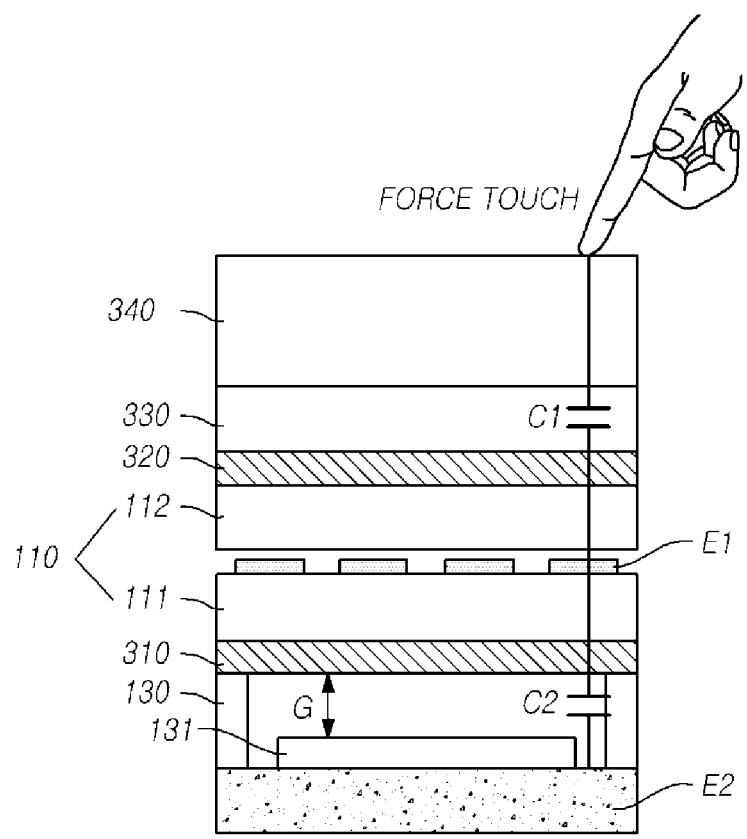
FIG. 3 is a cross-sectional view of the touch display device according to an embodiment of the present invention.
Figure 4:
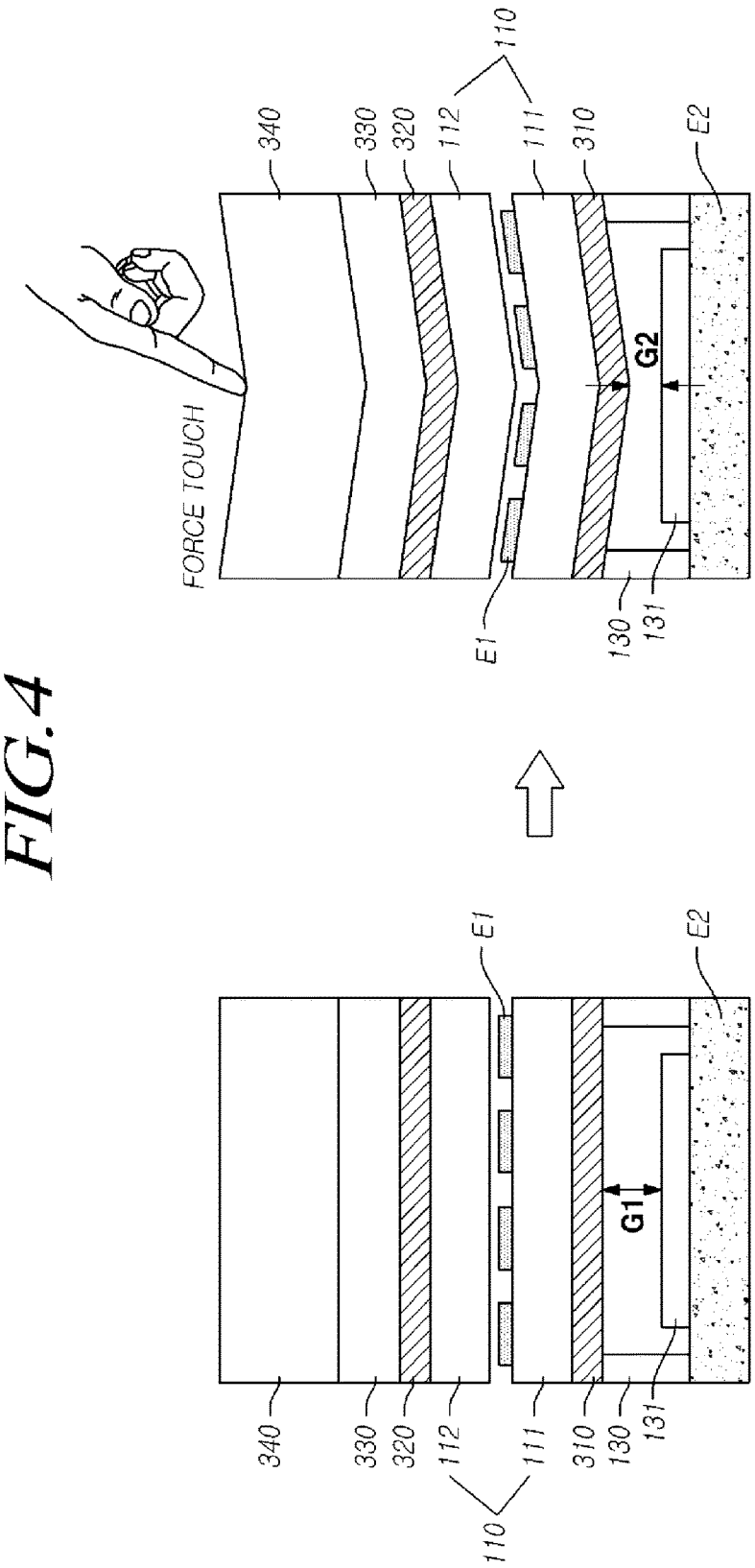
FIG. 4 illustrates a case in which a gap is changed in the touch display device according to an embodiment of the present invention.

FIG. 3 is a cross-sectional view of the touch display device 100 according to an embodiment of the present invention, and FIG. 4 illustrates changes in the gap between the first electrodes E1 and the second electrode E2 in response to a user touch made to the touch display device 100.

Referring to FIG. 3, the display panel 110 of the touch display device 100 includes a first polarizer 310, the first substrate 111, the first electrodes E1, the second substrate 112, a second polarizer 320, and so on.

A bonding layer 330 and a top cover 340 are disposed on the display panel 110.

The touch display device 100 applies the first electrode driving signal DS1 to the first electrodes E1 in a touch driving period, in which the touch position of the user is sensed, from among driving periods of the touch mode.

When a touch is made by the user, the touch position (touch coordinates) of the user is sensed by sensing changes in first capacitances C1 between a conductive pointer, such as a finger of the user, and the first electrodes E1.

The touch display device 100 applies the first electrode driving signal DS1 to the first electrodes E1 and applies the second electrode driving signal DS2 to the second electrode E2 in a force driving period, in which user touching force is sensed, from among the driving periods of the touch mode.

The second electrode signal DS2 applied to the second electrode E2 may be a ground voltage signal.

In addition, when a vertical load is formed in response to the user touch, an amount of user touching force is sensed by sensing changes in the second capacitances C2 in response to changes in the gap G between the first electrodes E1 and the second electrode E2.

When the touch has been made by the user, the touch position (touch coordinates) is sensed by sensing changes in the first capacitances C1, and then the touching force is sensed based on the result of sensing the changes in the second capacitances C2. The gap G is present between the first electrodes E1 and the second electrode E2 to enable changes in the second capacitances C2 to be sensed.

Referring to FIG. 4, when a vertical load is formed in response to the user touch, layers including the top cover 340 and the display panel 110 may bend slightly downwardly. The top cover 340 and display panel 110 are formed of a pliable material(s) that can be bent slightly.

This causes changes in the size of the gap G, such as an air gap or a dielectric gap, present between the first electrodes E1 and the second electrode E2.

As illustrated in FIG. 4, when the gap G is G1 before the vertical load has been made by the user touch and is G2 after the vertical load has been made by the user touch, G2 is reduced by the vertical load to be smaller than G1.

As the gap G between the first electrodes E1 and the second electrode E2 is reduced from G1 to G2 in response to the vertical load being formed by the user touch, there are changes in the second capacitances C2, whereby an amount of user touching force can be sensed.

Although the second electrode E2 for sensing user touching force may be a component added to the touch display device 100 to sense the touching force, the second electrode E2 may be implemented using an existing component of the touch display device 100.

For example, a bottom cover included in a backlight unit of an LCD device may be used as the second electrode E2 to sense user touching force.

Figure 5:
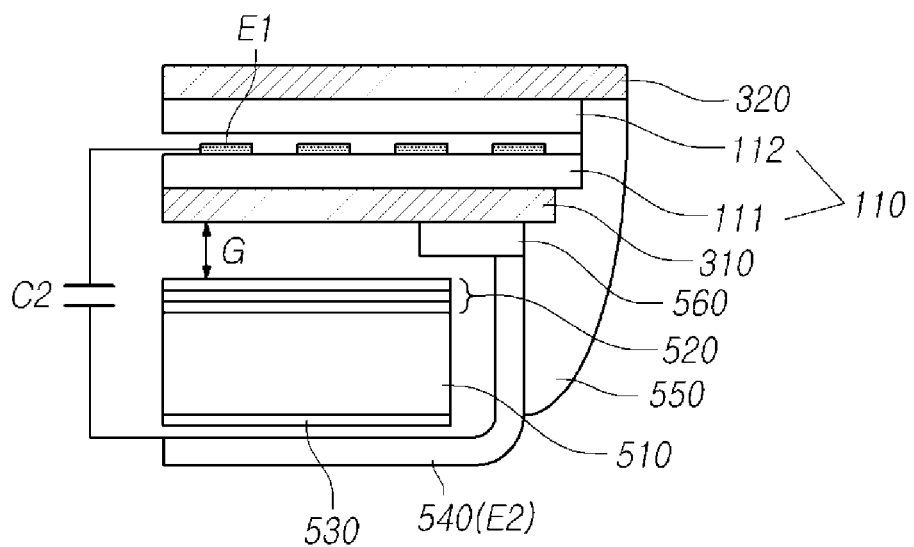
FIG. 5 and FIG. 6 are cross-sectional views of the touch display device according to an embodiment of the present invention in which a bottom cover is used as a touching force sensing electrode.
Figure 6:
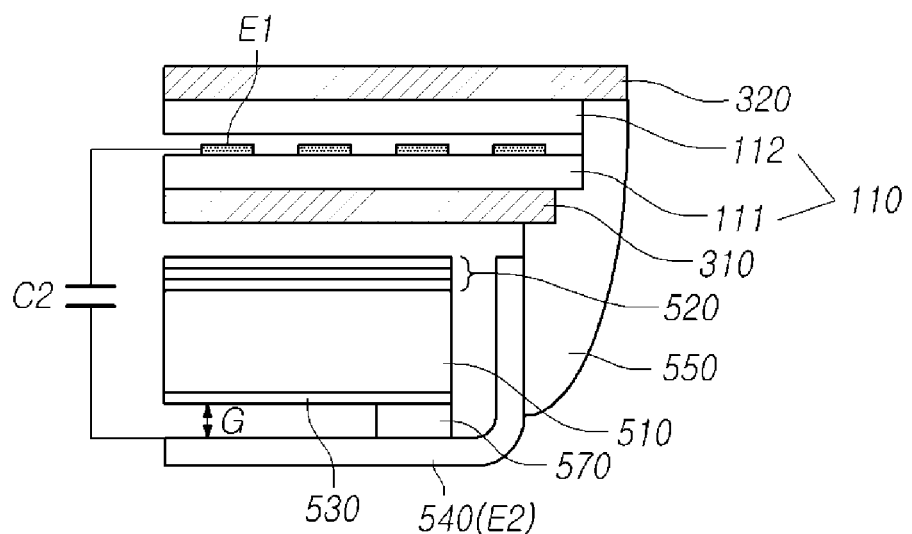

FIG. 5 and FIG. 6 are cross-sectional views of the touch display device 100 according to an embodiment of the present invention in which a bottom cover 540 is used as the second electrode E2.

Referring to FIG. 5, the touch display device 100 of the display panel 110 according to an embodiment of the present invention includes the first polarizer 310, the first substrate 111, the first electrodes E1, the second substrate 112, and the second polarizer 320.

A backlight unit may be disposed below the display panel 110. The backlight unit includes a light source (not shown), a light guide plate 510 guiding light incident from the light source to the display panel 110, an optical sheet 520 disposed above the light guide plate 510, a reflector 530 disposed below the light guide plate 510 to improve light efficiency, and the bottom cover 540 accommodating the light source, the light guide plate 510, the optical sheet 520, and the reflector 530.

The components, including the light source, the light guide plate 510, and so on, accommodated within the bottom cover 540, are also referred to as "structures accommodated within the bottom cover 540" or "internal structures of the backlight unit."

The display panel 110 may be connected to the bottom cover 540 of the backlight unit by means of a bonding material 550.

For example, as illustrated in FIG. 5, the outer surface of the display panel 110 may be connected to the outer surface of the bottom cover 540 by means of the bonding material 550.

Because the display panel 110 and the bottom cover 540 are connected to each other via the bonding material 550 disposed on the margins thereof, the overall thickness of the touch display device 100 can be reduced.

In addition, as illustrated in FIG. 5, the bonding material 550 connecting the display panel 110 and the bottom cover 540 to each other may be configured such that some of the portions thereof bonded to the margins of the display panel 110 and the bottom cover 540 are stepped.

This configuration can reduce the width of the bezel and increase the viewing angle of the display panel 110.

The touch display device 100 according to an embodiment of the present invention may use the bottom cover 540 of the backlight unit disposed below the display panel 110 as the second electrode E2 to sense user touching force.

Thus, in a period in which the touch display device 100 senses user touching force, the first electrode driving signal DS1 is applied to the first electrodes E1, and the second electrode driving signal DS2 is applied to the bottom cover 540 acting as the second electrode E2.

Here, the second electrode driving signal DS2 applied to the bottom cover 540 may be a ground voltage signal.

Because a gap is required to be present between the first electrodes E1 and the second electrode E2 to sense user touching force, a gap must be present between the display panel 110 having the first electrodes E1 disposed therein and the bottom cover 540 of the backlight unit corresponding to the second electrode E2.

FIG. 5 illustrates an example in which the gap G is present between the display panel 110 and the backlight unit.

Referring to FIG. 5, a gap member 560 is disposed on a portion in which the bottom surface of the display panel 110 joins the bottom cover 540 of the backlight unit, thereby forming the gap G between the display panel 110 and the backlight unit. Here, the gap member 560 may be light-blocking tape.

Because the gap G is formed between the bottom surface of the display panel 110 and the top surface of the backlight unit, the size of the gap G may vary in response to the vertical load being formed by a user touch.

In the state in which the first electrode driving signal DS1 is applied to the first electrodes E1 and the second electrode driving signal DS2 is applied to the bottom cover 540 corresponding to the second electrode E2, it is possible to sense user touching force by sensing changes in the second capacitances C2 in response to changes in the size of the gap G.

Thus, the existing component of the touch display device 100 is used as the second electrode E2 as described above. It is therefore possible to not only sense the touch position (touched coordinates) touched by the user but also the touching force applied by the user using the existing component.

FIG. 6 illustrates another example in which the bottom cover 540 of the backlight unit is used as the second electrode E2. A gap G is present between the bottom cover 540 of the backlight unit and a structure accommodated in the bottom cover 540.

Referring to FIG. 6, a gap member 570 having a predetermined thickness is disposed between the bottom surface of the reflector 530 of the backlight unit and the bottom cover 540 such that the gap G having a predetermined size is present between the internal structure of the backlight unit and the bottom cover 540. The gap member 570 may be formed of an insulating material.

Due to the gap G being present between the reflector 530 of the backlight unit and the bottom cover 540, when a vertical load is formed by a user touch, it is possible to sense changes in the second capacitances C2 in response to changes in the gap G, thereby sensing an amount of user touching force.

In addition to the gap G present between the reflector 530 of the backlight unit and the bottom cover 540, a gap having a predetermined size may be present between the top surface of the backlight unit and the bottom surface of the display panel 110.

This configuration can prevent the optical sheet 520 of the backlight unit from being damaged by the warping of the display panel 110 in response to the vertical load formed by a user touch.

As described above, in the touch display device 100 according to an embodiment of the present invention, the gap G is present between the display panel 110 and the backlight unit or between the internal structure of the backlight unit and the bottom cover 540, and the bottom cover 540 of the backlight unit can be used as the second electrode E2.

Due to this configuration, the touch display device 100 can not only sense the touch position (touched coordinates) of the user but also user touching force without a separate second electrode being added thereto.

When the bottom cover 540 of the backlight unit is warped, the gap between the first electrodes E1 and the bottom cover 540 corresponding to the second electrode E2 may become non-uniform, thereby decreasing the uniformity of sensing user touching force, which is problematic.

Figure 7:
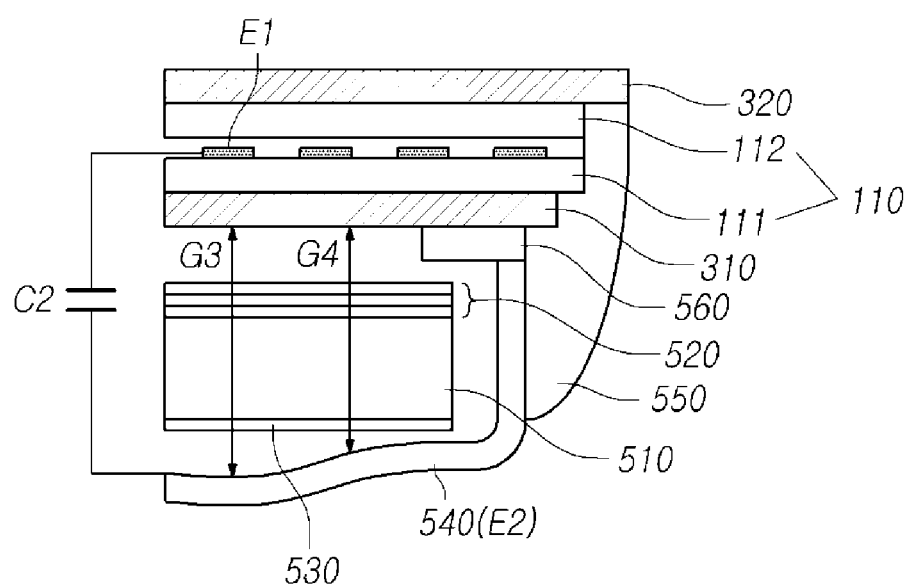
FIG. 7 and FIG. 8 are cross-sectional views each illustrating a change in a gap in the touch display device according to an embodiment of the present invention in which the bottom cover is used as a touching force sensing electrode.
Figure 8:
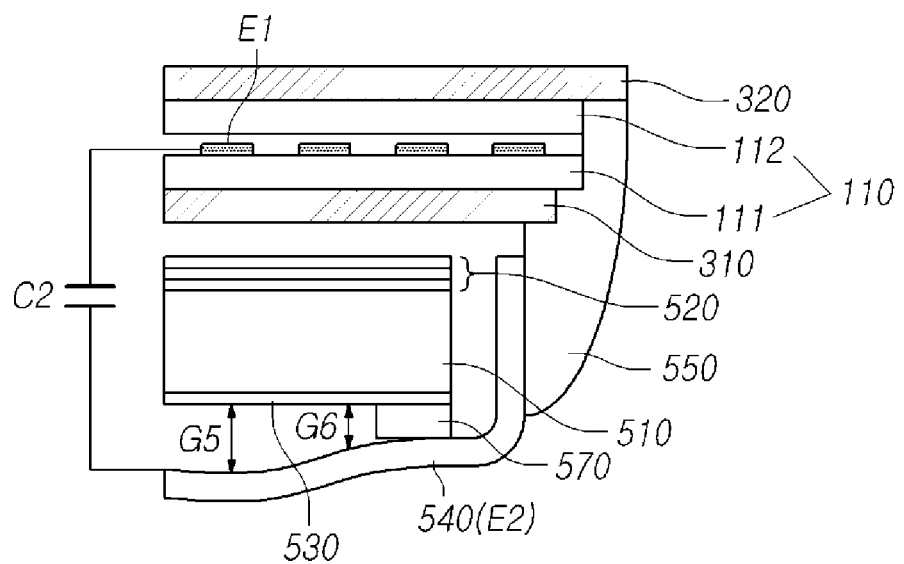

FIG. 7 and FIG. 8 illustrate examples in which the bottom cover 540 of the backlight unit is warped when the bottom cover 540 is used as the second electrode E2 of the touch display device 100.

FIG. 7 illustrates an example in which the bottom cover 540 is warped when a gap is present between the display panel 110 and the backlight unit of the touch display device 100, as in the example illustrated in FIG. 5.

Referring to FIG. 7, when the bottom cover 540 of the backlight unit is warped, different gaps G3 and G4 may be formed in different positions between the display panel 110 and the bottom cover 540 corresponding to the second electrode E2.

In this instance, changes in the gap between the first electrodes E1 and the bottom cover 540 corresponding to the second electrode E2 are non-uniform depending on the position in which a vertical load is formed by the user touch, the uniformity of sensing user touching force may decrease.

FIG. 8 illustrates an example in which the bottom cover 540 is warped when a gap is present between the internal structure of the backlight unit and the bottom cover 540 of the touch display device 100, as in the example illustrated in FIG. 6.

Referring to FIG. 8, when the bottom cover 540 of the backlight unit is warped, different gaps G5 and G6 may be formed in different positions between the internal structure of the backlight unit and the bottom cover 540.

In this instance, as in the example illustrated in FIG. 7, changes in the gap are non-uniform depending on the position in which a vertical load is formed by a user touch, the uniformity of sensing user touching force may decrease.

In the touch display device 100 according to an embodiment of the present invention, it is possible to not only sense an amount of touching force applied by the user using the existing component but also to improve the uniformity of touching force sensing using the existing component of the touch display device 100.

In addition, it is possible to form the gap for sensing the touching force without increasing the thickness of the touch display device 100, thereby providing a structure for reducing the thickness of the touch display device 100 able to sense the touching force.

Figure 9:
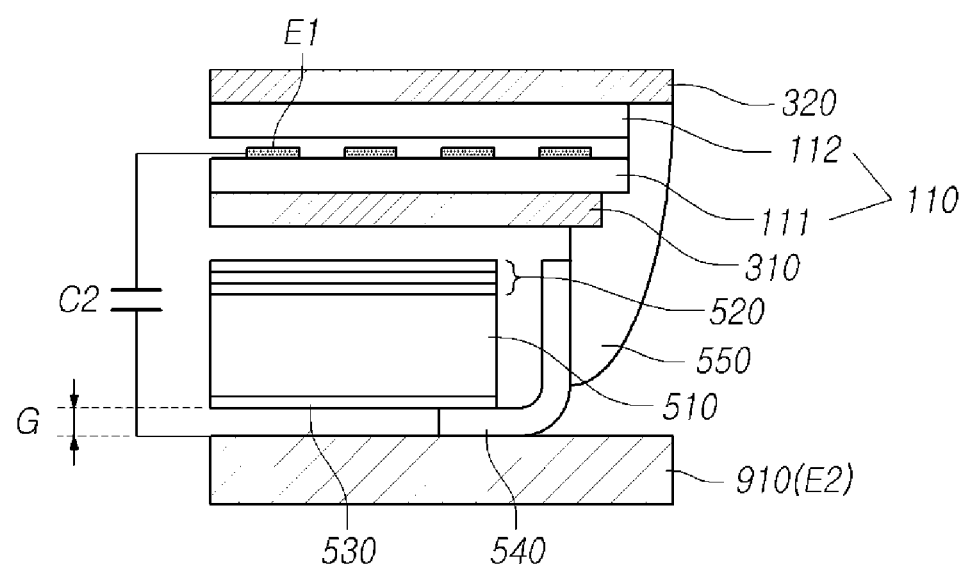
FIG. 9 is a cross-sectional view of the touch display device according to an embodiment of the present invention in which a case is used as a touching force sensing electrode.

FIG. 9 is a cross-sectional view of the touch display device 100 according to an embodiment of the present invention, in which a gap G is formed by the structure of the bottom cover 540 of the backlight unit, and a case 910 positioned below the backlight unit is used as the second electrode E2 for sensing an amount of touching force.

Referring to FIG. 9, the touch display device 100 according to an embodiment of the present invention includes the display panel 110, the backlight unit disposed below the display panel 110, the case 910 disposed below the backlight unit to act as the second electrode E2 to sense an amount of touching force, and so on.

The display panel 110 includes the first polarizer 310, the first substrate 111, the first electrodes E1, the second substrate 112, the second polarizer 320, and so on.

A structure implementing the backlight unit is disposed below the display panel 110 includes a light source, the light guide plate 510 guiding light incident from the light source to the display panel 110, the optical sheet 520 disposed above the light guide plate 510, the reflector 530 disposed below the light guide plate 510, and the bottom cover 540. The bottom cover accommodates the light source, the reflector 530, light guide plate 510 and optical sheet 520.

Here, the bottom cover 540 of the backlight unit may have an open area formed in the bottom thereof.

For example, the bottom cover 540 may be configured such that a portion of the bottom thereof, corresponding to the bottom surface of a structure accommodated therein, is opened. Thus, the bottom of the bottom cover 540 has the open area.

In this instance, the bottom cover 540 may be arranged along the margins of the structure accommodated therein to support the structure.

Alternatively, the bottom cover 540 may include an open areas in portions thereof corresponding to the bottom surface of the structure accommodated therein. The open areas may be arranged at predetermined distances from each other, such that the bottom of the bottom cover 540 has a grating structure. Also, the open areas may have the same shape (e.g. a circle, a rectangle, or so on) and the same size and may be arranged at predetermined distances from each other.

The structure of the bottom cover 540 including the at least one open area can prevent positional differences in the gap due to the warping of the bottom cover 540 while maintaining the uniformity of touching force sensing.

In addition, the open area of the bottom cover 540 may form a gap between the first electrodes E1 and the case 910 corresponding to the second electrode E2.

Specifically, as illustrated in FIG. 9, the case 910 disposed below the backlight unit is used as the second electrode E2, and the at least one open area is formed in the bottom cover 540 of the backlight unit, such that the gap G is formed between the internal structure of the backlight unit and the case 910 corresponding to the second electrode E2.

Here, the size of the gap G may correspond to the thickness of the bottom cover 540.

The case 910 may be, for example, a phone set frame when the touch display device 100 is a mobile device.

The case 910 may be an electrically conductive material, such as SUS stainless steel, because a second electrode driving signal DS2 for touching force sensing must be applied to the case 910.

Thus, according to an embodiment of the present invention, in a force driving period in which the touch display device 100 senses an amount of touching force, a first electrode driving signal DS1 are applied to the first electrodes E1 disposed within the display panel 110, and the second electrode driving signal DS2 is applied to the case 910 corresponding to the second electrode E2.

The second electrode driving signal DS2 applied to the case 910 corresponding to the second electrode E2 may be a ground voltage signal.

Because the gap G is present between the structure accommodated in the bottom cover 540 and the case 910 corresponding to the second electrode E2 due to the structure of the bottom cover 540 having the at least one open area, a vertical load formed by a user touch changes the size of the gap between the structure accommodated in the bottom cover 540 and the case 910 corresponding to the second electrode E2.

This consequently causes changes in the second capacitances C2 between the first electrodes E1 and the case 910 corresponding to the second electrode E2. It is thereby possible to sense an amount of user touching force by sensing changes in the second capacitances C2.

That is, the at least one open area is formed in the bottom cover 540 of the backlight unit, such that the gap G is present between the internal structure of the backlight unit and the case 910 disposed below the bottom cover 540. It is thereby possible to sense user touching force using changes in the gap G between the first electrodes E1 and the case 910 corresponding to the second electrode E2.

Figure 10:
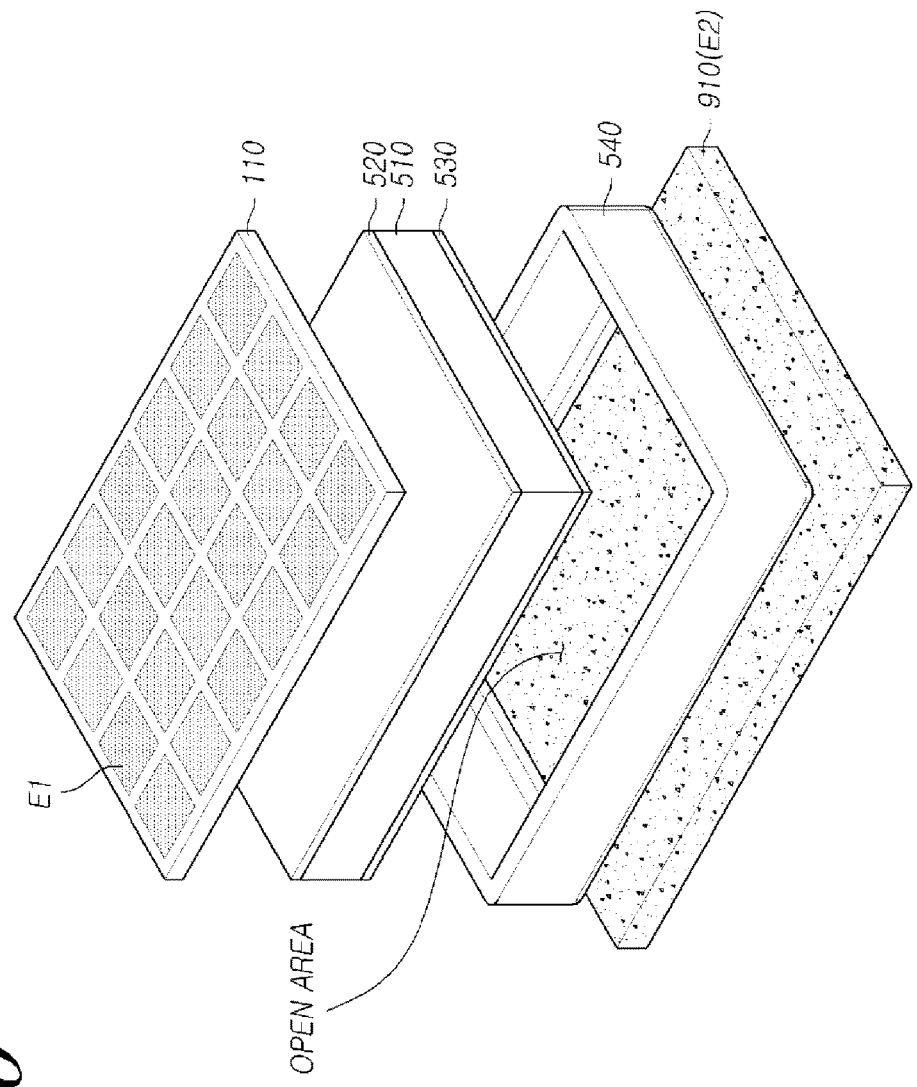
FIG. 10 is a perspective view illustrating the structure of the touch display device shown in FIG. 9.

FIG. 10 is a perspective view illustrating the structure of the touch display device 100 shown in FIG. 9.

Referring to FIG. 10, the touch display device 100 according to an embodiment of the present invention includes: the display panel 110 having the first electrodes E1 disposed therein; the backlight unit disposed below the display panel 110; and the case 910 disposed below the backlight unit.

When the display panel 110 operates in a display mode, display driving voltages are applied to the first electrodes E1 disposed within the display panel 110. When the display panel 110 operates in a touch mode, a first electrode driving signal DS1 is applied to the first electrodes E1.

In addition, the case 910 disposed below the backlight unit is used as the second electrode E2 for touch force sensing, and a second electrode driving signal DS2 is applied to the case 910 in a force driving period of the touch mode.

The backlight unit disposed below the display panel 110 includes a light source, the light guide plate 510 guiding light incident from the light source to the display panel 110, the optical sheet 520 disposed above the light guide plate 510, the reflector 530 disposed below the light guide plate 510, and the bottom cover 540. The bottom cover accommodates the light source, reflector 530, light guide plate 510 and optical sheet 520.

The bottom cover 540 has an open area formed in a portion thereof corresponding to the bottom surface of the internal structure of the backlight unit.

For example, the bottom cover 540 is configured to support the margins of the internal structure of the backlight unit accommodated therein. The portion of the bottom of the bottom cover 540, other than the portions supporting the internal structure of the backlight unit, may be opened to form the open area.

Because the open area is formed in the bottom of the bottom cover 540 supporting the internal structure of the backlight unit, a gap is formed between the bottom surface of the internal structure of the backlight unit and the case 910 disposed below the bottom cover 540.

Due to this configuration, the gap is present between the first electrodes E1 disposed within the display panel 110 and the case 910 corresponding to the second electrode E2. It is thereby possible to sense user touching force by sensing changes in the gap between the first electrodes E1 and the case 910 in the force driving period.

According to an embodiment of the present invention, a gap for touching force sensing (or a touching force sensing gap) is formed in the touch display device 100, which includes the second electrode E2 to which a second electrode driving signal DS2 for touching force sensing is applied, such that the touch display device 100 can not only sense a touch position (touched coordinates) of the user but also an amount of touching force.

In addition, an existing component of the touch display device 100, such as the bottom cover 540 of the backlight unit, is used as the second electrode E2, such that the touch display device can sense an amount of user touching force without the addition of a separate structure or member as the second electrode.

Furthermore, the case 910 disposed below the backlight unit is used as the second electrode E2, and the open area is formed in the bottom cover 540. It is thereby possible to reduce the weight of the touch display device 100 as well as to prevent the uniformity of sensing an amount of user touching force from decreasing by preventing positional differences in the gap due to the warping of the bottom cover 540.

In addition, because the touching force sensing gap is formed by the open area of the bottom cover 540, no additional structure to form the touching force sensing gap in the touch display device 100 is required. It is thereby possible to sense an amount of user touching force without increasing the thickness of the touch display device 100.

Figure 11:
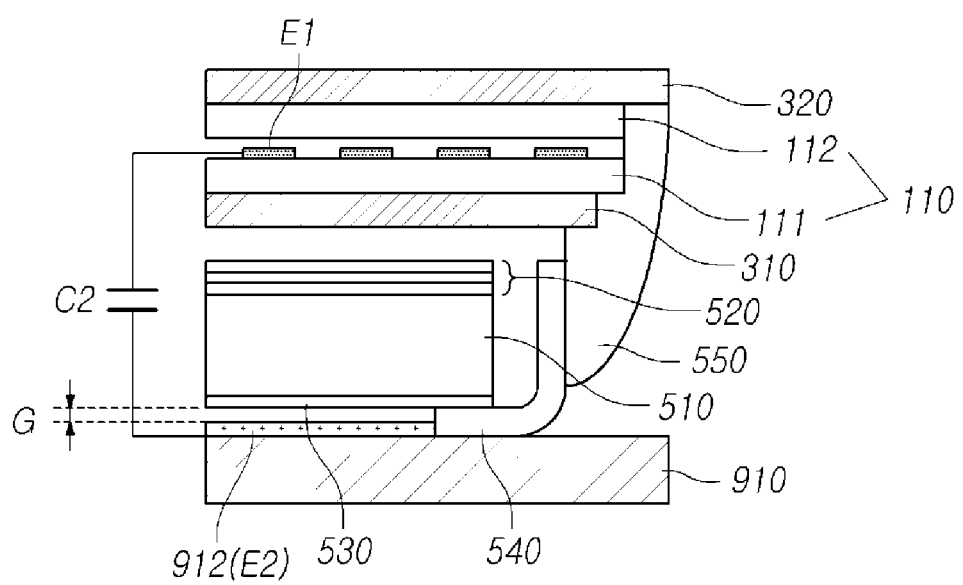
FIG. 11 is a cross-sectional view of another touch display device according to an embodiment of the present invention.

FIG. 11 is a cross-sectional view of another touch display device 100 according to an embodiment of the present invention, in which a gap G is formed by the structure of the bottom cover 540 of the backlight unit. As in the touch display device 100 of FIGS. 9 and 10, a case 910 is positioned below the backlight unit. The touch display device 100 further includes a conductive layer, such as a conductive plate 912, as the second electrode E2 for sensing an amount of touching force. The conductive plate 912 is positioned within the open area formed in the bottom of the bottom cover 540.

The bottom cover 540 may be arranged along the margins of the structure accommodated therein to support the structure.

Alternatively, the bottom cover 540 may include open areas in portions thereof corresponding to the bottom surface of the structure accommodated therein. The plurality of open areas may be arranged at predetermined distances from each other, such that the bottom of the bottom cover 540 has a grating structure. The conductive plate 912 may be positioned within the open areas.

The structure of the bottom cover 540 including the at least one open area can prevent positional differences in the gap due to the warping of the bottom cover 540 while maintaining the uniformity of touching force sensing.

In addition, the open area of the bottom cover 540 may form a gap between the first electrodes E1 and the conductive plate 912 corresponding to the second electrode E2.

Specifically, as illustrated in FIG. 11, the conductive plate 912 disposed below the backlight unit may be used as the second electrode E2, and the at least one open area is formed in the bottom cover 540 of the backlight unit, such that the gap G is formed between the internal structure of the backlight unit and the conductive plate 912 corresponding to the second electrode E2.

Here, the size of the gap G may correspond to the thickness of the bottom cover 540, except for the thickness of the conductive plate 912.

The case 910 may be an electrically conductive material, such as SUS stainless steel, or may be another material having high strength and stiffness, such as aluminum or an alloy thereof. The conductive plate 912 is an electrically conductive material, such as SUS stainless steel, because a second electrode driving signal DS2 for touching force sensing is applied to the conductive plate 912.

Thus, according to embodiments of the present invention, in a force driving period in which the touch display device 100 senses an amount of touching force, a first electrode driving signal DS1 are applied to the first electrodes E1 disposed within the display panel 110, and the second electrode driving signal DS2 is applied to the conductive plate 912 corresponding to the second electrode E2.

The second electrode driving signal DS2 applied to the electrode pattern layer 912 corresponding to the second electrode E2 may be a ground voltage signal.

Because the gap G is present between the structure accommodated in the bottom cover 540 and the conductive plate 912 corresponding to the second electrode E2 due to the structure of the bottom cover 540 having the at least one open area, a vertical load formed by a user touch changes the size of the gap between the structure accommodated in the bottom cover 540 and the conductive plate 912 corresponding to the second electrode E2.

This consequently causes changes in the second capacitances C2 between the first electrodes E1 and the conductive plate 912 corresponding to the second electrode E2. It is thereby possible to sense an amount of user touching force by sensing changes in the second capacitances C2.

That is, the at least one open area is formed in the bottom cover 540 of the backlight unit, such that the gap G is present between the internal structure of the backlight unit and the conductive plate 912 disposed below the bottom cover 540. It is thereby possible to sense user touching force using changes in the gap G between the first electrodes E1 and the conductive plate 912 corresponding to the second electrode E2.

Figure 12:
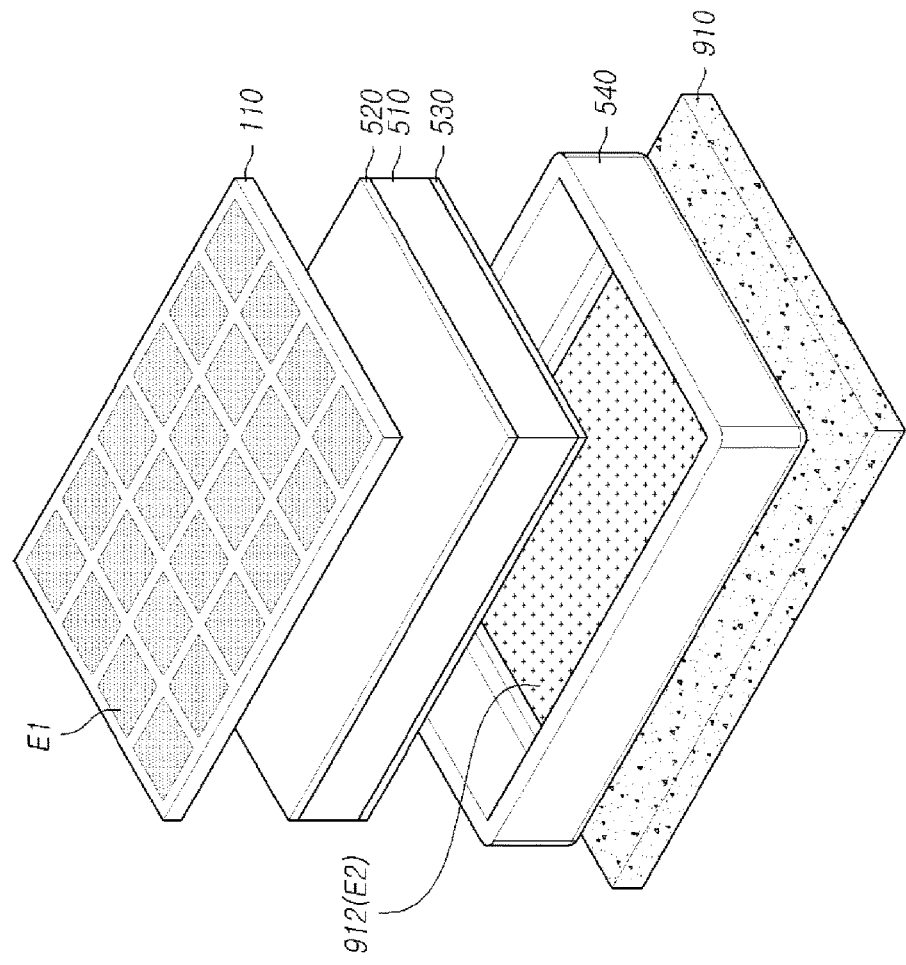
FIG. 12 is a perspective view illustrating the structure of the touch display device shown in FIG. 11.

FIG. 12 is a perspective view illustrating the structure of the touch display device 100 shown in FIG. 11.

Referring to FIG. 12, the touch display device 100 according to embodiments of the present invention includes the display panel 110 having the first electrodes E1 disposed therein, the backlight unit disposed below the display panel 110, and the case 910 disposed below the backlight unit.

When the display panel 110 operates in a display mode, display driving voltages are applied to the plurality of first electrodes E1 disposed within the display panel 110. When the display panel 110 operates in a touch mode, a first electrode driving signal DS1 is applied to the first electrodes E1.

In addition, the conductive plate 912 disposed within an open area formed in the bottom of the bottom cover is used as the second electrode E2 for touch force sensing, and a second electrode driving signal DS2 is applied to the conductive plate 912 in a force driving period of the touch mode.

A structure implementing the backlight unit is disposed below the display panel 110 and includes a light source, the light guide plate 510 guiding light incident from the light source to the display panel 110, the optical sheet 520 disposed above the light guide plate 510, the reflector 530 disposed below the light guide plate 510, and the bottom cover 540. The bottom cover accommodates the reflector 530, light guide plate 510 and optical sheet 520.

The open area of the bottom cover 540 is formed in a portion thereof corresponding to the bottom surface of the internal structure of the backlight unit.

For example, the bottom cover 540 is configured to support the margins of the internal structure of the backlight unit accommodated therein. The portion of the bottom of the bottom cover 540, other than the portions supporting the internal structure of the backlight unit, may be opened to form the open area.

Because the open area is formed in the bottom of the bottom cover 540 supporting the internal structure of the backlight unit, a gap is formed between the bottom surface of the internal structure of the backlight unit and the conductive plate 912 disposed within the open area of the bottom cover 540.

Due to this configuration, the gap is present between the first electrodes E1 disposed within the display panel 110 and the conductive plate 912 corresponding to the second electrode E2. It is thereby possible to sense user touching force by sensing changes in the gap between the first electrodes E1 and the conductive plate 912 in the force driving period.

According to embodiments of the present invention, a gap for touching force sensing (or a touching force sensing gap) is formed in the touch display device 100, which includes the second electrode E2 to which a second electrode driving signal DS2 for touching force sensing is applied, such that the touch display device 100 can not only sense a touch position (touched coordinates) of the user but also an amount of touching force.

In addition, the conductive plate 912 may be used to provide particular functions. For example, the pattern of electrodes in the conductive plate 912 may correspond to the arrangement of the first electrodes E1. When an amount of touch is sensed at a first electrode E1, a function corresponding to the corresponding electrode E2 in the electrode pattern layer 912 may relate to a function of a touch-based user interface of a particular type. By positioning the conductive plate 912 within an open area of the bottom cover 540, the thickness of the touch display device 100 is not increased.

Furthermore, the conductive plate 912 disposed below the backlight unit is used as the second electrode E2, and the open area is formed in the bottom cover 540. It is thereby possible to reduce the weight of the touch display device 100 as well as to prevent the uniformity of sensing an amount of user touching force from decreasing by preventing positional differences in the gap due to the warping of the bottom cover 540.

In addition, because the touching force sensing gap is formed by the open area of the bottom cover 540, no additional structure to form the touching force sensing gap in the touch display device 100 is required. It is thereby possible to sense an amount of user touching force without increasing the thickness of the touch display device 100.

The foregoing descriptions and the accompanying drawings have been presented in order to explain the certain principles of the present disclosure. A person skilled in the art to which the disclosure relates can make many modifications and variations by combining, dividing, substituting for, or changing the elements without departing from the principle of the disclosure. The foregoing embodiments disclosed herein shall be interpreted as illustrative only but not as limitative of the principle and scope of the disclosure. It should be understood that the scope of the disclosure shall be defined by the appended Claims and all of their equivalents fall within the scope of the disclosure.

What is claimed is:

1. A touch display device comprising:
a display panel having a plurality of electrodes including a first electrode and a second electrode disposed therein;
a light source device disposed below the display panel and emitting light to the display panel;
a bottom cover disposed on sides of and below a structure to accommodate the light source device; and
a case disposed below the bottom cover, and the case including an electrically conductive material,
wherein the bottom cover has an open area in a portion thereof corresponding to a bottom surface of the light source device,
wherein the open area of the bottom cover forms a gap between the bottom surface of the light sources device and a top surface of the case,
wherein display driving voltages for displaying images are applied to the plurality of electrodes during a display mode period of the touch display device,
wherein a first electrode driving signal is applied to the plurality of electrodes during a touch driving period of the touch display device,
wherein a second electrode driving signal is applied to the case during a force driving period of the touch display device, and
wherein the second electrode is a part of the case.

2. The touch display device according to claim 1, wherein the second electrode driving signal applied to the case disposed below the bottom cover comprises a ground voltage signal.

3. The touch display device according to claim 1, wherein the open area includes a plurality of open areas formed in the portion of the bottom cover corresponding to the bottom surface of the light source device.

4. The touch display device according to claim 1, wherein a gap is present between a bottom surface of the display panel and a top surface of the light source device.

5. The touch display device according to claim 1, further comprising a bonding material disposed on outer margins of the display panel and outer margins of the bottom cover to connect the display panel and the bottom cover to each other.

6. The touch display device according to claim 5, wherein some of portions of the bonding material bonded to the outer margins of the display panel and the outer margins of the bottom cover are stepped.

7. The touch display device according to claim 1, wherein the bottom cover includes an electrically conductive material.

8. A touch display device comprising:
   a plurality of first electrodes disposed in a display panel;
   a second electrode disposed outside of the display panel and spaced apart from the plurality of first electrodes; and
   a bottom cover disposed below the plurality of first electrodes, accommodating a structure disposed below the display panel, and having an open area in a portion thereof corresponding to a bottom surface of the structure,
   wherein the open area of the bottom cover forms a gap between the bottom surface of the structure disposed below the display panel and a top surface of the second electrode,
   wherein display driving voltages for displaying images are applied to the plurality of first electrodes during a display mode period of the touch display device,
   wherein a first electrode driving signal is applied to the plurality of first electrodes during a touch driving period of the touch display device,
   wherein a second electrode driving signal is applied to the second electrode during a force driving period of the touch display device, and
   wherein the second electrode is a part of the bottom cover.

9. The touch display device according to claim 8, wherein the open area includes a plurality of open areas formed in the portion of the bottom cover corresponding to the bottom surface of the structure.

10. The touch display device according to claim 9, further comprising a case disposed below the bottom cover,
    wherein the second electrode comprises a conductive layer disposed on the case and positioned within the plurality of open areas formed in the bottom of the bottom cover,
    wherein the conductive layer includes a pattern of electrodes that correspond to the plurality of open areas.

11. The touch display device according to claim 8, wherein a gap is present between a bottom surface of the display panel and a top surface of the structure disposed below the display panel.

12. The touch display device according to claim 8, further comprising a bonding material disposed on outer margins of the display panel and outer margins of the bottom cover to connect the display panel and the bottom cover to each other.

13. The touch display device according to claim 12, wherein some of portions of the bonding material bonded to the outer margins of the display panel and the outer margins of the bottom cover are stepped.

14. The touch display device according to claim 8, wherein the second electrode driving signal applied to the second electrode comprises a ground voltage signal.

15. The touch display device according to claim 8, wherein the second electrode comprises an electrically conductive case disposed below the bottom cover.

16. The touch display device according to claim 8, further comprising a case disposed below the bottom cover, wherein the second electrode comprises a conductive layer disposed on the case and positioned within the open area formed in the bottom of the bottom cover.

17. The touch display device according to claim 16, wherein the open area of the bottom cover forms a gap between the bottom surface of the structure disposed below the display panel and a top surface of the conductive layer.

18. A touch display device comprising:
    a plurality of first electrodes disposed in a display panel;
    a second electrode disposed outside of the display panel and spaced apart from the plurality of first electrodes;
    a bottom cover disposed below the plurality of first electrodes, accommodating a structure disposed below the display panel, and having an open area in a portion thereof corresponding to a bottom surface of the structure, wherein the open area includes a plurality of open areas formed in the portion of the bottom cover corresponding to the bottom surface of the structure; and
    a case disposed below the bottom cover, wherein the second electrode comprises a conductive layer disposed on the case and positioned within the plurality of open areas formed in the bottom of the bottom cover, wherein the conductive layer includes a pattern of electrodes that correspond to the plurality of open areas,
    wherein the open area of the bottom cover forms a gap between the bottom surface of the structure disposed below the display panel and a top surface of the second electrode.

* * * * *